Dec. 19, 1933.   R. HETHERINGTON   1,940,090
THERMOSTATIC CONTROL DEVICE
Filed Dec. 4, 1931   3 Sheets-Sheet 1
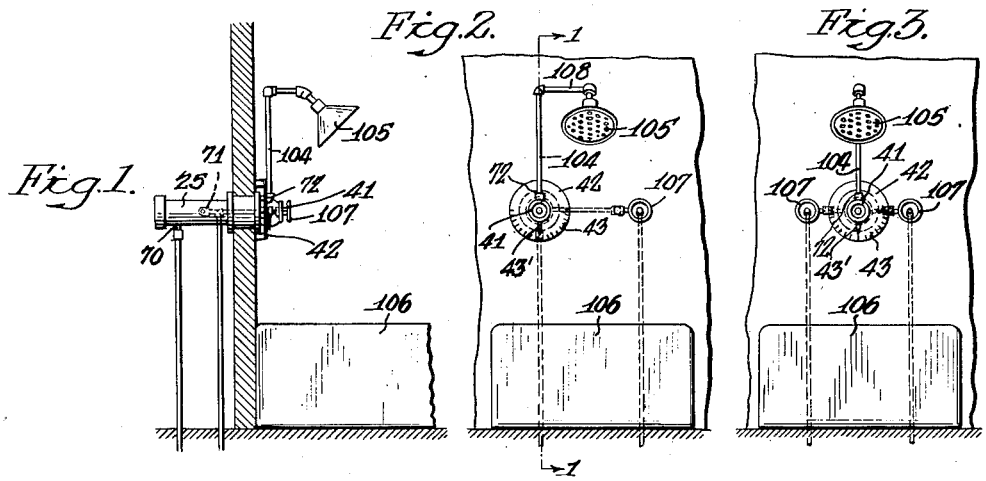
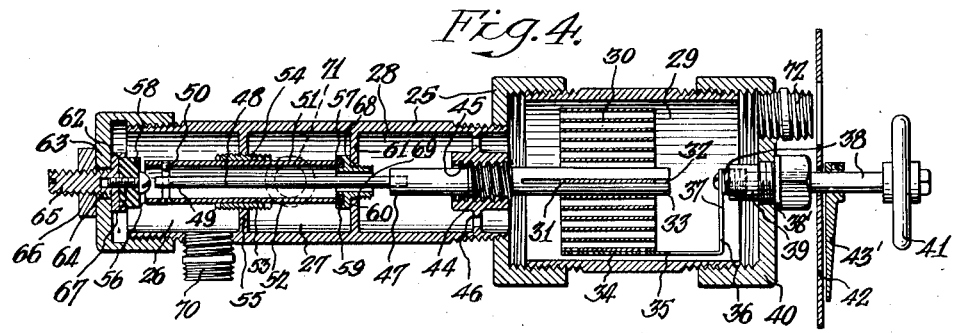

Dec. 19, 1933.  R. HETHERINGTON  1,940,090
THERMOSTATIC CONTROL DEVICE
Filed Dec. 4, 1931   3 Sheets-Sheet 2
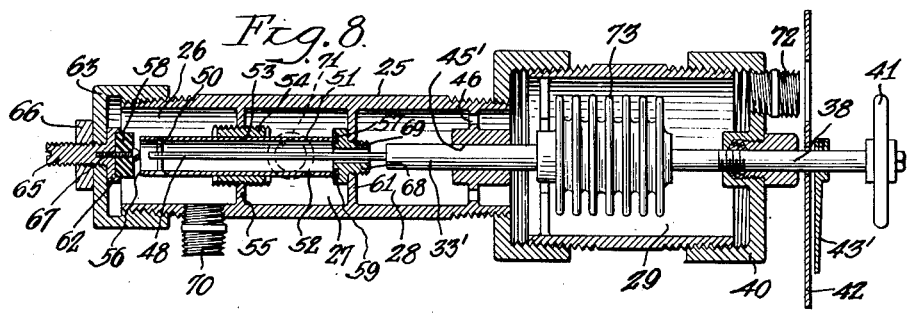
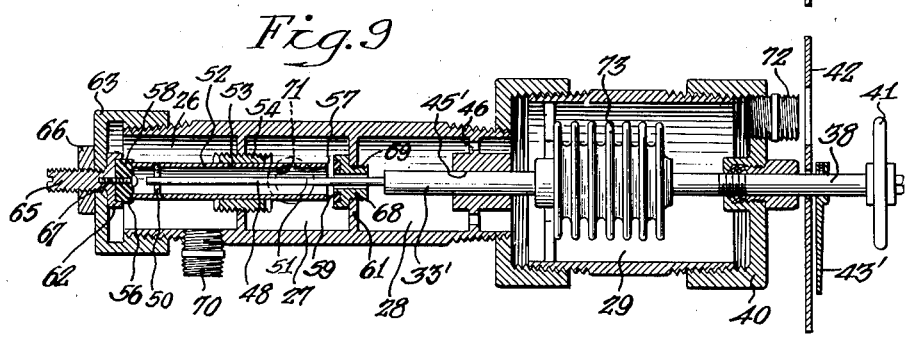
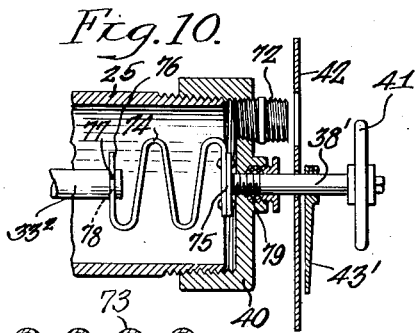
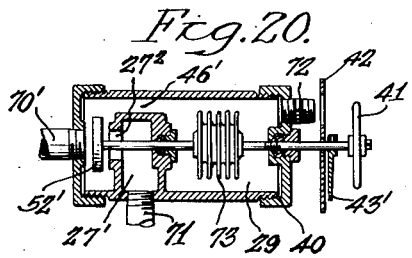
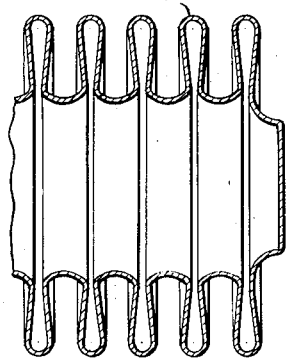
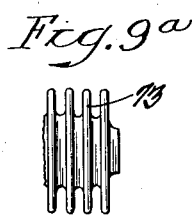
Inventor
Robert Hetherington

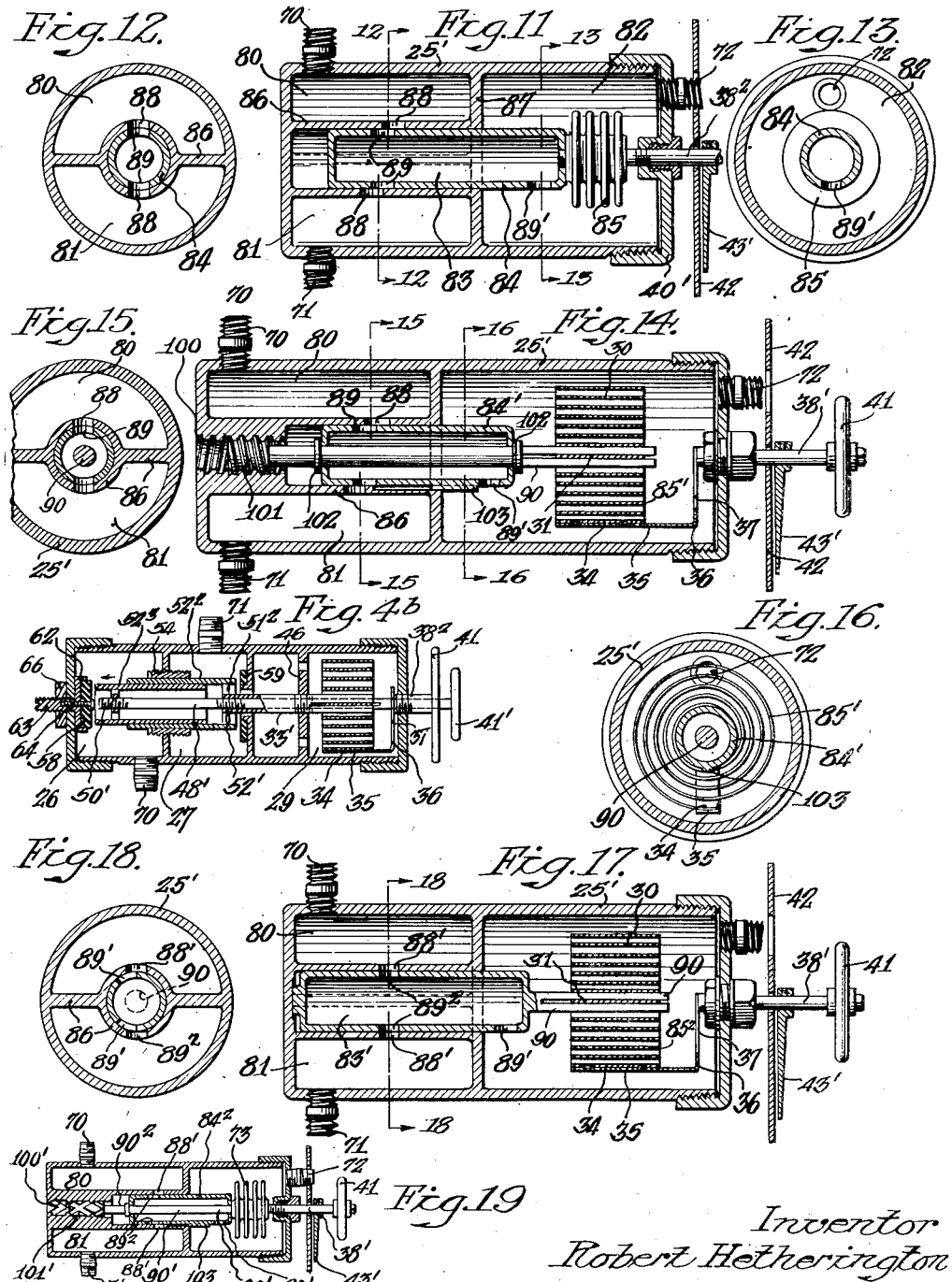

Patented Dec. 19, 1933

1,940,090

UNITED STATES PATENT OFFICE 1,940,090

THERMOSTATIC CONTROL DEVICE

Robert Hetherington, Sharon Hill, Pa.,

Application December 4, 1931. Serial No. 578,955

13 Claims. (Cl. 236—12)

My invention relates to shower baths, with more particular reference to the regulation of water flow into shower heads. While intended for use in any application to which it may be adapted, my invention is believed to have perhaps its best use in connection with showers for limiting the shower temperature, as for example, in structure including a thermostatic element, opening and closing the water supply to a mixing chamber from which the water is discharged to the shower head at a temperature that is not too high.

A purpose of my invention is to provide a novel adjustable temperature control device for shower bath structure in which adjustment can be obtained without detaching the device from its location in the pipe line of the shower bath, and from outside the control device.

A further purpose is to enclose a thermostat optionally comprising a bellows-like or a coiled spring expanding and contracting element, operable by hot or cold water contracting with the element, in a chamber that is separate from the inlet chamber of a control device.

A further purpose is to provide a valve with a reciprocating stem adapted to carry a sleeve, and to move the sleeve into and out of engagement with valve seats at its ends to allow water from either of two chambers to pass through the sleeve and into another chamber to come in contact with a thermostatic element in the last mentioned chamber.

A further purpose is to advance or return the movement of a spindle attached to a thermostatic coiled spring by threading a portion of the stem into a bore rigid with the body of a control device.

A further purpose is to rigidly connect one end of a thermostatic element to a cap of a control device and to detachably secure the opposite end of the thermostatic element to a valve spindle in the control device.

A further purpose is to construct a thermostatic control device which has a hollow valve member adapted to longitudinal movement which will, by contraction or expansion of the thermostat, concurrently open and close apertures to allow or prevent discharge of water from either of two inlet compartments, into a thermostatic chamber.

A further purpose is to impart rotary motion to a hollow spindle of a control device, by means of a coiled thermostatic element, to cause opening and closing of hot and cold water compartments and thereby pass the water through the hollow spindle into contact with the thermostat, to move the spindle when the temperature of the water varies.

A further purpose is to construct a control device for shower bath structure in which two inlet chambers cooperate with a mixing chamber, which mixing chamber discharges into a thermostatic chamber, the temperature of the water, discharged into the thermostatic chamber, controlling the registry of a valve with the inlet chambers.

Further purposes will appear in the specification and in the claims.

I have preferred to illustrate a few only of the many different forms my invention may assume, selecting forms that are practical and efficient in operation and which well illustrate the principles involved.

Referring to the drawings:

Figure 1 is a sectional elevation of a shower bath with my control device in place behind an adjacent wall, the section being taken on the line 1—1 of Figure 2.

Figure 2 is a front elevation of Figure 1, illustrating one arrangement of piping connections.

Figure 3 is a front elevation similar to Figure 2, but illustrating a different form of piping connections.

Figure 4 is a longitudinal section of a preferred form of my control valve.

Figure 4a is a view similar to Figure 4 but showing the valve in a different position.

Figure 4b is a view similar to Figure 4 but showing a modification of the valve construction.

Figure 5 is a view similar to Figure 4, but showing the valve in a different position.

Figure 6 is a transverse section on the line 6—6 of Figure 5.

Figure 7 is a transverse section on the line 7—7 of Figure 5.

Figure 8 is a view similar to Figure 4, but showing a different form of thermostatic element.

Figure 9 is a view similar to Figure 8, but illustrating the valve in a different position.

Figure 9a is a fragmentary view of a modified form of thermostat.

Figure 9b is an enlarged fragmentary section of the thermostatic element of Figures 8 and 9 in a position corresponding to that during ordinary temperature, and illustrating the normal inward dishing of the bellows member during normal low temperatures.

Figure 10 is a fragmentary view similar to a portion of Figures 4, 5, 8 and 9, but showing a modified form of thermostat.

Figure 11 is a longitudinal section of a modified form of control device in which a longitudinally hollow movable valve, with a bellows thermostatic control, is used as a mixing chamber.

Figure 12 is a transverse section taken on the line 12—12 of Figure 11.

Figure 13 is a transverse section taken on the line 13—13 of Figure 11.

Figure 14 is a longitudinal section similar to Figure 11, and having a longitudinally movable hollow valve adapted to be used as a mixing chamber and operated by a coiled thermostatic element.

Figure 15 is a transverse section on the line 15—15 of Figure 14.

Figure 16 is a section taken upon the line 16—16 of Figure 14.

Figure 17 is a longitudinal section similar to Figures 11 and 14, but showing another modification in which a hollow valve is adapted to rotary movement by a coiled thermostatic element.

Figure 18 is a transverse section on the line 18—18 of Figure 17.

Figure 19 is a modification of the structure of Figure 17.

Figure 20 is a vertical section similar to Figure 19, but showing modified forms of water inlets.

I prefer to place my control device behind the wall of a bathroom, but it will be clearly understood that this is a matter of choice only, and it may be applied at any convenient location to meet the requirements of the user. I have therefore illustrated it in the drawings as being placed behind a wall with its supply piping connections behind the wall and its outlet to the shower head inside the wall and above a bath tub.

Any convenient arrangement of control may be used and it is with this thought in mind that the different arrangements of controlling devices are shown in Figures 2 and 3.

In general, I plan to mix together hot and cold water coming from hot and cold water supply lines, to conduct the mixed water into contact with a temperature-sensitive device, and thereby, to control the relative quantities of hot and cold water which go into the mixture. I may apply my invention to a number of somewhat variant uses, such as, to maintain a constant range of temperature of mixed water passing to the shower head, irrespective of the temperatures of the hot and cold water supplies, or to set maximum and minimum temperature, either or both, for the mixed water.

As shown in Figures 4 to 7, my control device 25 preferably includes a number of compartments, such as a hot water supply chamber 26, a cold water supply chamber 27 and a mixing chamber 28 from which the water is free to pass into a thermostatic chamber 29, into which I place a thermostatic element 30, preferably of the coiled spring type. The coiled spring at its inner end 31 is fastened in a slot 32 in a spindle 33 of the control valve and at its outer end 34 is secured to an extension 35 of an L-shaped bracket 36. The inner end 37 of the bracket 36 is attached to a spindle 38 in a fitting 39 supported in a cap 40, at the front end of the control member 25 and carries an adjusting handle 41. The spindle is packed at 38'.

A dial 42 having graduations 43 is secured to the wall structure at the front end of the control valve and registers with a pointer 43' fixed to the spindle 38. It will be obvious that by turning the handle 41 the pointer 43' can be set at any desired temperature as indicated by the graduations 43 on the dial 42. The setting can of course be accomplished by trial and error without using the dial.

By setting the pointer at a designated point on the dial, thereby turning the spring through the spindle 33, the user can be assured that the temperature of the water passing the thermostat chamber 29 will lie within a range determined by the pointer.

The spindle 33 is provided with threads 44 that cooperate with a threaded bore 45. Between the bore 45 and the outer casing of the control device, I form an apertured wall 46 dividing the thermostat chamber 29 and the mixing chamber 28.

At its outer end the shoulder 47 of the spindle 33 is reduced in diameter to form a rearwardly projecting longitudinal arm 48. The arm 48 is connected at 49 by means of a screw 50, or by any similar fastening means, with a valve member 51, in the present instance in the form of a sleeve 52, which is guided in an aperture 53 of a nut 54 placed in a wall 55 separating the hot and cold water chambers.

The sleeve 52 is adapted to make sealing connection at its opposite ends 56 and 57 with valve seats 58 and 59, one of which at the inner end 60 is secured in a wall 61 between the cold water chamber and the mixing chamber, and at its opposite end in a seat holder 62 secured to the cap 63 on the rearward end of the control device.

Cold water enters through an inlet into the cold water chamber and hot water enters through an inlet into the hot water chamber. After the water passes from either of the chambers, through the sleeve into the mixing chamber and from the mixing chamber into the thermostat chamber, the temperature of the water will have its expanding or contracting effect upon the thermostatic element, and thereby turn the spindle, which will cause the sleeve to move in one direction if the water is too hot, or in the opposite direction if the water is too cold. If the water in the thermostatic chamber be markedly hot or markedly cold, the sleeve may entirely seat at one end or the other. If the water be of a desirable temperature, that is, not too hot or not too cold, according to the thermostat setting, the valve will remain neutral, as seen in Figure 4a, and both hot and cold water will be allowed to pass into and through the sleeve member, into the mixing chamber and thence to the thermostat chamber, from which the mixed water will be supplied to the shower head through the outlet in the cap end of the control device.

The sleeve may be adjusted to suit the preference of the user as to temperature, by turning the handle 41 to cause the pointer 43' to register at a designated place on the dial. This movement of the dial will move the sleeve to enlarge or reduce the relative initial openings of the hot and cold water control valves.

The valve seat 58 is held in a holder by a screw 67, and has an outwardly extending threaded end 65, which passes through an opening 64 in a cap 63 and is held in place by a nut 66. The seat 59 at the inner valve end is provided with a threaded end 68 and engages threads 69 in the wall 61.

Hot water inlet connection is made at 70 to the chamber 26 and cold water inlet is made at 71 into the chamber 27. Supply to the shower is made from the thermostat chamber through an outlet 72.

For a given setting of the pointer 43' with the graduations 43 on the dial 42, the operation of the thermostatic control as illustrated in Figures 4-7 is as follows:

Initially, assuming that the sleeve 52 is intermediate between its two limiting positions as shown in Figure 4a, hot water entering through the inlet 70 will pass through the chamber 26 and the annular space between the end of the sleeve 56 and the valve seat 58, into the interior of the sleeve 52, thence longitudinally of the sleeve into the mixing chamber 28, thence through the apertured wall 46 into the thermostatic chamber 29, and finally from the thermostatic chamber out through the outlet 72.

Cold water entering through the inlet 71 will pass from the cold water chamber 27 through the annular space between the end 57 of the sleeve 52 and the seat 59, then, along with the hot water, into the mixing chamber 28, where it is thoroughly mixed with hot water, and finally through the apertured wall 46 into the thermostatic chamber 29 and thence through the outlet 72.

It will be noted, that, by the time the cold and hot water enter the thermostatic chamber 29, they have an opportunity for thorough mixing due to their passage together through the annular interior of the nipple 68, across the mixing chamber and through the apertured wall 46, thus eliminating the possibility that cold water may be segregated from hot water and tend to influence the thermostatic element unequally.

Should the temperature of the mixed water be abnormally high, the thermostatic element 30 will expand, causing rotation of the spindle in a direction to move the spindle and the sleeve 52 toward the left in Figure 4, decreasing the opening of the hot water. This decrease in quantity of hot water will be progressive until the temperature of the hot water is reduced to such an amount that the thermostat has no further tendency to expand.

The effect of the increase in the temperature of the incoming hot water upon the temperature of the mixed water will thus be much less pronounced due to the tendency of the thermostat to decrease the size of the hot water inlet as the incoming hot water temperature rises. Thus the maximum rise in temperature due to variation in incoming hot water temperature is decreased.

On the other hand, in case the temperature of the water is too low, the thermostat will contract, rotating the spindle 33 in the direction to move the spindle and the sleeve 52 to the right in Figure 4, decreasing the opening of the cold water valve and reducing the quantity of cold water in the mixture.

When the cold water temperature has been reduced sufficiently so that the thermostatic element no longer has a further tendency to contract, the temperature of the water in the mixing chamber will increase, approaching the temperature indicated by the position of the pointer 43' with respect to the graduations 43 on the dial 42. The maximum fall in temperature due to decrease in the cold water inlet temperature is therefore lessened by the thermostat.

It will be evident, therefore, that with this form of thermostat, without regard to the initial temperatures or pressures of the inlet hot and cold water, the temperature of the water discharged from the control valve is never more than slightly above or below the temperature set by the pointer 43' on the dial 42.

The maintained range of temperature of discharge from the control valve may be varied at any time by turning the handle 41, thus moving the bracket 36 and changing the initial position of the thermostatic element 30. As the handle 41 turns, the pointer 43' moving over the graduations 43 on the dial 42 indicates at any position the location of the temperature range which the thermostat will maintain for that setting of the dial.

It is of course evident that difference in pressure of the inlet hot and cold water will be compensated, since both the hot and cold water will preferably be drawn from the same mains, and the variation in rate of discharge due to change in pressure will then be the same for both hot and cold water.

The form of Figures 4-7 I consider preferable for large installations, on account of its strength and reliability.

In the forms of my invention shown in Figures 8 and 9, I have illustrated a bellows-like or sylphon thermostatic element 73 instead of the coiled spring as used in the previously described figures. The use of either of these thermostatic elements is optional, and I find that one will operate as well as the other. In the matter of manufacture, the form shown in Figures 8 and 9 has some advantages, in that it imparts a longitudinal movement instead of a rotary movement to the valve spindle, and therefore it will not be necessary to form threads upon the spindle 33' or upon the bore 45' through which the spindle passes.

In all other respects the control unit of Figures 8 and 9 is identical with that of Figures 4 to 7, and I have therefore given them the same reference characters.

The thermostatic control of Figures 8 and 9 may be used to shut off the hot water from the mixing chamber when a definite maximum temperature is reached. When this function is to be served, I preferably provide a definite resistance which must be overcome by the thermostatic element before it can expand to an extent to fully close the hot water inlet. The most convenient loading resistance which may be applied to the thermostatic element is the pressure of the atmosphere. I therefore in Figures 8 and 9 make my thermostatic elements air-tight, evacuating part of the air from their interior so that during normal operation, the free end of the bellows is dished inwardly by the excess of pressure outside the bellows as compared to that within the bellows, the bellows expanding and contracting thermostatically but with an inward dishing of the free end. In order to expand to a point to fully close the valve, a considerable spring pressure must be built up in the walls of the sylphon element to overcome the pressure outside of the sylphon element within the thermostatic compartment. When this excess pressure is overcome, due to the excessive rise of temperature within the sylphon, the sylphon end wall will expand with a snap, instantly closing the inlet of hot water to the mixing chamber by seating the sleeve 52 against the hot water valve seat 58.

The setting of the control valve in the form of Figures 8 and 9 is the same as that in Figures 4-7, but the control valve in the form of Figures 8 and 9 does not automatically maintain the range of temperature setting, merely turning off the hot water when an excessive temperature is reached.

In the form of Figure 9a, I illustrate a fragmentary variation of the form of Figures 8 and 9 in which the control valve operates exactly as that of Figures 4-7, maintaining the definite temperature setting. The only difference between the thermostat of Figures 8 and 9 and that of Figure 9a is that in Figure 9a the thermostat is not evacuated, so that the sylphon element can expand progressively uniformly throughout its entire range of movement for corresponding temperature rises, instead of expanding suddenly toward the upper limit of its range of movement to effect sudden complete closure of the hot water inlet.

In Figure 10 I have illustrated another form of thermostatic element in which a spring member 74 is fastened to the spindle 38' at one end 75 and at its opposite end 76 to a spindle 33². The spindle can conveniently be grooved at 77 to allow for engagement of a slotted end 78 of the thermostat 74. The spindle 38' is provided with a stuffing box 79. The remaining parts correspond to those shown in Figures 4 to 9. It will be obvious that the form of Figure 10 is quite simple in construction and will provide progressive longitudinal movement as will the bellows-type thermostat of Figure 9a.

Bellows-type or sylphon thermostatic elements are commonly of two types. In the one form, the thermostatic shell is filled with an expansible liquid or vapor which acts progressively to lengthen the thermostat as the temperature increases, and to shorten the thermostat as the temperature decreases.

In the other form, while a gas or vapor is present in the thermostat, the thermostatic chamber is suitably evacuated, so that the operating end of the sylphon thermostat is normally inwardly dished, the sylphon expanding and contracting below a predetermined temperature with the free end of the thermostat inwardly dished and giving a snap expansion when a predetermined temperature is reached such as to make it desirable to wholly close the hot water inlet.

In the previously described figures I have shown a hot water inlet chamber, a cold water inlet chamber, a mixing chamber and a thermostatic chamber all formed as stationary compartments in one unit.

In Figures 11 to 19 I illustrate forms having movable mixing chambers, which, while broadly coming within my invention, are specifically the invention of Walter Chism, claimed in an application copending herewith Serial No. 585,865, entitled "Thermostatic control device".

In the forms shown in Figures 11, 12 and 13, I have provided a hot water inlet compartment 80, a cold water inlet compartment 81 and a thermostatic compartment 82 in the control device proper, but with a longitudinal movable mixing compartment 83. The mixing compartment 83 is formed in a hollow longitudinal movable sleeve 84, secured to a bellows-like thermostatic element 85, the element being fastened to a spindle 38² on which a pointer 43' is fixed at the cap end 40' of the control unit. Near the opposite end of the hollow sleeve, I provide a guiding inner casing 86 integral with the control device 25', the casing having walls 87 which form ends of the compartment 80 and 81. I place apertures 88 in the casing that cooperate with apertures 89 in the hollow sleeve 84.

Hot water is supplied into the hot water chamber 80 and cold water is supplied into the cold water chamber 81. The water from both chambers will pass through the apertures into the hollow sleeve or, in the present instance, the mixing chamber, and outwardly through a port 89' in the hollow sleeve into the thermostatic chamber, from whence it will pass through the outlet to the shower.

The thermostat 85 is of the progressively expanding type.

If the water should become too hot, the thermostat will expand and cause the hollow sleeve to move longitudinally to close the hot water inlet to the sleeve by relative movement of the ports, at the same time opening the cold water inlet. On the other hand, if the water should become too cold, the construction of the bellows will cause the hollow sleeve to move in the opposite direction and cause the cold water inlet to the sleeve to close, opening the hot water inlet. The cold and hot water inlets to the mixing chamber are preferably arranged so that the hot water inlet is fully closed when the cold water inlet is fully open and vice versa.

In Figures 14, 15 and 16, I have illustrated a device somewhat similar to that of Figures 11, 12 and 13, excepting that the thermostat in the form of Figures 14 to 16 is a coiled spring. The inner end of the spring is fastened in a slot in the valve spindle 90 and its outer end is fixed to an L-shaped bracket as described before. Longitudinal movement of the hollow sleeve 84' is obtained due to expansion or contraction of the coiled thermostatic element 85' operating about the valve spindle 90.

Threads 100 are formed in the outer end of the control device, and these engage threads 101 upon the outer end of the valve spindle 90. The valve spindle 90 is inserted through openings in the end of the hollow sleeve 84' and packing rings 102 insure closure at the ends of the hollow sleeve, while permitting turning of the spindle 90 with respect to hollow sleeve 84'. It will be obvious that rotation of the thermostatic spring will revolve the spindle, and cause the valve sleeve to move longitudinally, due to the longitudinal movement of the spindle caused by the cooperating threads between the spindle and the control device. The valve sleeve will not rotate because of a key 103 extending from the sleeve into a slot in the valve casing.

The operation of the control unit of Figures 14 to 16 is substantially the same as that of Figures 11 to 13. The thermostat will maintain any desired range of temperature of discharge and the range of temperature of discharge may be varied by moving the handle 41. If the temperature of the mixed water tends to rise due to increase in temperature of the incoming water (hot or cold) the thermostat will minimize the increase, and if the temperature of the mixed water tends to fall due to decrease in temperature of the incoming water (hot or cold) the thermostat will minimize the decrease.

In the form of Figures 11 to 13 and 14 to 16, the valve sleeve is caused to move longitudinally, but in Figures 17 and 18 I have shown a device in which the valve sleeve is rotatable. As in Figure 14, I place a coiled spring 85² in a thermostatic chamber and secure the inner end of the spring in a slot in the valve spindle 90, the outer ends of the thermostatic spring being secured to an L-shaped bracket as described previously.

Water is supplied to the thermostatic chamber through cooperating ports 88' and 89² from a hot water chamber 80 and a cold water chamber 81 to a mixing chamber 83' in the valve sleeve, and discharged through an opening at the forward end of the valve sleeve into the thermostatic chamber. If the water should become too hot, the thermostatic element 85² will expand, rotating the sleeve counterclockwise in the position of Figure 18, descreasing the size of the hot water opening to the mixing chamber and increasing the size of the cold water opening, so that the water in the mixing chamber will become cooler, although the temperature finally reached will not be as low as the initial temperature of the mixed water. In case the water becomes too cold, the thermostatic element 85² will contract turning the sleeve clockwise in the position of Figure 18, increasing the size of the hot water opening to the mixing chamber and decreasing the size of the cold water opening, so that the water in the mixing chamber will get hotter, although it will not rise quite to the temperature indicated by the pointer. In case a surge of excessively hot water reached the thermostat, it will shut off the hot water entirely, protecting the user from possible scalding.

The rear end of the casing is suitably recessed to provide a bearing surface for the outer end of the spindle.

Figure 19 is a modification of the structure of Figure 11, in which a sleeve 84² is loose on a spindle 90' as shown in Figure 14, the key 103 engaging a slot in the sleeve guide to prevent rotation of the valve sleeve.

A pivotal joint 90² on the spindle 90' is interposed between the thermostatic element and a threaded end 101' engaging a threaded bore 100'. The thermostatic element in this form is of the evacuated type, moving with a snap when the temperature of the mixed water rises above a definite maximum, and cutting off the hot water by closing the hot water ports.

I may if I desire, eliminate the hot and cold water chambers or greatly reduce their size in any of my forms, replacing the sleeve by a solid disc valve if I prefer. In Figure 20 I show a valve of the general type of Figures 8 and 9, differing therefrom only in the use of a disc valve 52' operating directly upon the end of the hot water inlet 70' and a port 27² from the small cold water chamber 27'. The mixed water flows into the thermostatic chamber through the port 46'.

The operation of the form of Figure 20 may be that of the valve shown in Figures 8 and 9, or that of the valve of Figure 9a.

The dial and pointer registering device as described in Figures 4 and 5 is the same throughout the different views, and these parts have received the same reference characters.

Hot water flowing through a shower bath structure has many times caused serious injury to people, particularly in hotels, where those not familiar with the details of the hot water system turn on the water, often without proper care, and where variations in pressure of the hot water due to use at other parts of the system are not under the control of the individual user. The consequence is scalding of the user and liability of the hotel. My invention is intended to correct this fault in the structures at present in use.

In Figures 1 and 2 I show a pipe 104, from the outlet of the thermostatic chamber, feeding a shower nozzle 105 placed above a bath tub 106. In this structure, the control valve is mounted beside the valve faucet handle 107 and the shower nozzle 105 extends from a branch pipe 108 to spray into approximately the center of the bath tub. The control valve is here used as an ultimate shut-off and turn-on valve for either the hot or cold water, the other being turned off and on by means of the faucet handle 107.

In Figure 3, however, the upwardly extending pipe 104 to the shower head is placed intermediate the control valves and the registering dial and pointer are also intermediate the valve controls, but below the shower nozzle and within easy reach of the user. The hot and cold water are turned off and on by the valve faucet handles 107.

While in Figures 1 to 3 I show separate faucets to turn either the hot or cold water on and off, I may, if I desire, turn the hot and cold water off and on by my control valve also. In Figure 4b I show a valve similar to that of Figure 4, modified by constructing the valve sleeve 52 of Figure 4 in the form of two telescoping sleeves 52² and 52³ that are unadapted to relative rotation about a common longitudinal axis and whose relative longitudinal positions are determined by a long spindle 48' having right and left hand threads engaging respectively in right and left hand threaded bores of spiders 50' and 51². The spider 50' is united to the sleeve 52² and the spider 51² is united to the sleeve 52³. The stem 48' may be turned by a handle 41' which is located beyond the usual control valve handle.

The control valve stem 33 of Figure 4 now consists of a sleeve 33' which is united to the thermostatic element at one end, and to the spider 51² at the other. Likewise the shaft 38 of Figure 4 now consists of a sleeve 38² which carries the handle 41 and the thermostatic adjusting arm 36.

Assuming the valve of Figure 4b to be in the position shown in the drawings, the water may first be turned on by rotating the handle 41', thus increasing the extent of telescoping of the sleeves 52² and 52³, due to the action of the right and left hand threads of the spindle 48' upon the spiders 50' and 51². After the water has been turned on, the temperature may be adjusted by the handle 41, and the thermostat will then function to maintain the same range of temperature just as in the form of Figures 4 to 7. The water may subsequently be turned off by returning the control handle 41 to its initial position and thus decreasing the extent of telescoping of the sleeves 52² and 52³ by turning the shut-off handle 41'.

It will be evident that I provide a valve in which an initial adjustment of the relative quantities of hot and cold water passing through the valve may be made and then a range of temperature close to the initial setting is thermostatically maintained. Obviously, this broad principle may be applied to a wide variety of valves, and accordingly several valve constructions have been illustrated, without thought, however, that they exhaust the subject matter. The intention is merely to suggest that the invention is applicable to a wide variety of shower bath control valves, whether they operate progressively or merely to prevent an excessive rise in temperature.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent, is:—

1. In a shower bath mixing unit, a casing, opposing hot and cold water valve seats, hot and cold water inlet connections to the respective seats, a valve sleeve between the seats capable of seating upon either, an annular external guide for the valve sleeve intermediate between its extremities and supported by the casing, a mixing chamber having an inlet port at one seat registering with the interior of the sleeve, a valve stem extending through the sleeve and attached to it, threaded over a portion of its length to engage cooperating threads supported by the casing, a flat spiral thermostat in the casing, internally engaging the valve stem and an adjustable support for the external end of the thermostat, whereby the valve position is variable by changing the position of the support and also by expansion and contraction of the thermostat.

2. In a shower bath mixing unit, a valve casing, a tubular valve within the casing having two variable valved openings to the tube interior and having continuous outlet at one end, one of which inlets is enlarged, and the other of which inlets is made smaller by moving the valve in one direction, hot and cold water connections to the openings, a flat spiral thermostat connected to the valve near the center of the spiral, discharge connections from the said outlet to the space around the thermostat and an adjustable support for the radially outside end of the thermostat.

3. In a shower bath mixing valve, a valve casing, a valve within the valve casing having two variable valved openings whose size is controlled by a longitudinally movable sleeve, hot and cold water connections to the openings, a valve spindle extending into and being united to the sleeve, threads on the spindle cooperating with threads united to the casing, water discharge connections from the valved openings through the sleeve and into a mixing chamber, water connections from the mixing chamber to a thermostatic chamber, a flat spiral thermostat in the thermostatic chamber united to the spindle near the center to the spiral, a bracket adjustably supporting the outside of the spiral, a handle accessible outside the casing and rigid with the bracket and a pointer moving with the handle indicating the position of the bracket.

4. In a shower bath mixing unit, a valve casing, a manually adjustable double valve controlling the relative quantities of hot and cold water and a thermostat controlling the valve and having a snap-acting cut-off of the admission of hot water when the temperature of the mixed water exceeds a predetermined temperature.

5. In a shower bath control valve, a casing, walls forming hot and cold water inlet openings, a valve controlling the relative quantities of hot and cold water flowing through the openings, a handle and mechanical connections for setting the valve and a thermostat between the connections, said thermostat controlling the valve and having a snap-acting cut-off for shutting off the hot water inlet when an excessive temperature is reached.

6. In a shower bath mixing unit, a valve casing, a double acting valve which closes one opening and opens another when moved in a given direction, means for manually setting the position of the valve and a sylphon thermostat varying the valve position for a given setting responsive to the temperature of the water, said sylphon having a free end positioning the valve and adapted to snap movement at a predetermined high temperature.

7. In a shower bath control valve, a valve casing a double-acting valve in the casing, increasing one opening and decreasing another when the valve is moved in one direction, hot and cold water connections to the openings, fluid discharge connections to a thermostatic chamber, and a sylphon thermostat in the thermostatic chamber which controls the position of the valve, which has a movable end operatively connected to the valve and adapted to snap shut the valve when an excessive temperature is reached.

8. In a shower bath mixing unit, a casing, opposing valve seats within the casing, a longitudinally movable valve sleeve between the seats, said sleeve having an outlet port across one open end inside and surrounded by one of the seats, hot and cold water connections outside the seats to the space adjacent the respective seats, means for adjusting the longitudinal position of the valve, said means extending outside the casing and a sylphon thermostat in the casing forming part of the means for adjusting the valve position, in heat transfer relation with water passing through the said port.

9. In a shower bath mixing unit, a casing, opposing valve seats within the casing, a longitudinally movable valve sleeve between the seats, said sleeve having a stationary outlet port surrounded by one of the seats and across one open end of the sleeve, a valve spindle extending through the said outlet port into the sleeve and secured to the valve, a sylphon thermostat attached to one end of the valve spindle and acting longitudinally of the spindle and means adjustable from outside the casing supporting the other end of the thermostat, the valve seat located toward the thermostat being in contact with hot water, the other valve seat being in contact with cold water and the thermostat being in contact with mixed hot and cold water passing through the said outlet port into a mixing chamber communicating with the thermostat, the seats and thermostat being in separate chambers within the casing.

10. In a shower mixing unit, a casing, walls dividing the casing into a hot water inlet compartment, a cold water inlet compartment, a mixing compartment and a thermostat compartment having an outlet, the mixing and thermostat compartments communicating one with the other and the walls having one opening connecting the inlet compartments and another opening connecting one of the inlet compartments to the mixing compartment, in combination with a movable tube loosely fitting the inside of the opening between the hot and cold water compartments, connecting the inlet compartments and having one end directed to the said other opening whereby the tube interior is in continuous communication with the mixing compartment, valve seats adapted respectively at progressively variant positions of the tube to oppositely adjustably close or open the communication between the respective inlet compartments and the tube interior, a thermostat mounted in the thermostat compartment and connections between the thermostat and tube, providing thermostatic control of the position of the tube to thermostatically control the flows from the inlet compartments to the mixing compartments.

11. The structure of claim 10 in which there is a throttled connection between the mixing compartment and the thermostat compartment.

12. The structure of claim 10 in which said connections between the tube and thermostat include a stem through the said other opening into the tube interior and substantially at the tube axis, whereby water discharging from the inlet compartments, in passing through the said other opening into the mixing compartment, forms turbulent generally concentric streams, one stream, except for turbulent intermixing of the streams, surrounding the other and both surrounding streams flowing around the stem.

13. In a shower bath mixing unit including a thermostat compartment having an outlet to the shower, a hot water inlet compartment, a cold water inlet compartment, an outlet from one of the inlet compartments to the thermostat compartment, a tubular valve element that has a forward portion of its length in the said one inlet compartment for delivery into an inner portion of the outlet from the said one inlet compartment, that carries within its interior only flow from the other inlet compartment and mechanism including a thermostat in the thermostat compartment and connections between the thermostat and valve element whereby thermostatically controlled movement of the tube reversely adjusts inlet flow into the tube of one stream and discharge of the other stream to surround the outlet discharge of the tube.

ROBERT HETHERINGTON.